(12) United States Patent
Patel et al.

(10) Patent No.: US 8,555,649 B2
(45) Date of Patent: Oct. 15, 2013

(54) FUEL NOZZLE SWIRLER ASSEMBLY

(75) Inventors: Bhawan B. Patel, Mississauga (CA);
Oleg Morenko, Oakville (CA);
Nagaraja Rudrapatna, Chandler, AZ (US)

(73) Assignee: Pratt & Whitney Canada Corp., Longueuil, QC (CA)

( * ) Notice: Subject to any disclaimer, the term of this patent is extended or adjusted under 35 U.S.C. 154(b) by 1048 days.

(21) Appl. No.: 12/552,380

(22) Filed: Sep. 2, 2009

(65) Prior Publication Data
US 2011/0048023 A1 Mar. 3, 2011

(51) Int. Cl.
*F02C 7/22* (2006.01)
(52) U.S. Cl.
USPC .................................. 60/748; 60/737; 60/740
(58) Field of Classification Search
USPC ........................................... 60/737, 740, 748
See application file for complete search history.

(56) References Cited

U.S. PATENT DOCUMENTS

| 2,959,355 | A | 11/1960 | Houser |
| 3,301,356 | A | 1/1967 | Pompa |
| 3,403,758 | A | 10/1968 | Stout |
| 3,692,372 | A | 9/1972 | Pineo |
| 3,781,125 | A | 12/1973 | Rahaim et al. |
| 4,536,932 | A | 8/1985 | Athey |
| 5,071,313 | A | 12/1991 | Nichols |
| 5,197,290 | A | 3/1993 | Lee et al. |
| 5,222,357 | A | 6/1993 | Eddy et al. |
| 5,479,773 | A | 1/1996 | McComb et al. |
| 5,535,585 | A | 7/1996 | Eichhorn |
| 5,593,276 | A | 1/1997 | Proctor et al. |
| 5,850,895 | A | 12/1998 | Evrard |
| 6,651,912 | B2 * | 11/2003 | Gulati et al. .................. 239/553 |
| 6,823,677 | B2 | 11/2004 | Prociw et al. |
| 7,097,422 | B2 | 8/2006 | Rice et al. |
| 2006/0248898 | A1 * | 11/2006 | Buelow et al. .................. 60/776 |

FOREIGN PATENT DOCUMENTS

EP 1540247 5/2010

* cited by examiner

*Primary Examiner* — Gerald Luther Sung
*Assistant Examiner* — Scott Walthour
(74) *Attorney, Agent, or Firm* — Norton Rose Fulbright Canada LLP

(57) ABSTRACT

A fuel nozzle air swirler assembly has a slotted cap to provide stress-relief. The stress-relief slits in the cap have an axial and a tangential component to impart a swirl to the air leaking therethrough in the same direction as that of the air exiting the swirler body.

6 Claims, 5 Drawing Sheets

FUEL NOZZLE SWIRLER ASSEMBLY

TECHNICAL FIELD

The application relates generally to gas turbine engines and, more particularly, to an air swirler assembly of a fuel nozzle.

BACKGROUND OF THE ART

Gas turbine fuel nozzles typically comprise an outer air swirler which is, in use, exposed to higher temperatures than the rest of the fuel nozzle, and is therefore subject to thermal stressing which can cause cracking particularly when the air swirler is a two-piece construction comprising a cap rigidly secured on an air swirler vane body. The thermal differential growth between the cap and the swirler vane body results in high stresses in the swirler vane as well as in the joints between the cap and the body. These thermally induced stresses negatively affect the Low Cycle Fatigue (LCF) life of the fuel nozzle.

While there is a need to improve the durability of fuel nozzle air swirlers, the proposed solutions should have as little impact as possible on the aerodynamic performances of the air swirler.

SUMMARY

In one aspect, there is provided an air swirler assembly for atomizing fuel discharged from a gas turbine engine fuel nozzle, comprising a swirler body having a circumferential array of air swirler vanes defined in a peripheral surface thereof about a central axis of the body, and a cap securely fitted over the swirler body and cooperating with the air swirler vanes to define a plurality of air swirling passages, the cap having an annular body with stress-relief slits defined therein, the stress-relief slits having an axial and a circumferential component defining an air swirling direction corresponding to that of the air swirler vanes.

In a second aspect, there is provided an air swirler assembly for atomizing fuel discharged from a gas turbine engine fuel nozzle, comprising a swirler body having a circumferential array of air swirler vanes defined in a peripheral surface thereof about a central axis, and a cap securely fitted over the swirler body and cooperating with the air swirler vanes to define a plurality of air swirling passages, the cap having an annular body with at least one helical stress-relief slit defined in an outer surface, the helical stress-relief slit being set obliquely to the central axis to turn leakage air flowing from the air swirling passages through the helical stress-relief slit in a same direction as that of the air exiting from the air swirling passages.

DESCRIPTION OF THE DRAWINGS

Reference is now made to the accompanying figures, in which.

DETAILED DESCRIPTION OF THE PREFERRED EMBODIMENTS

Figure 1:
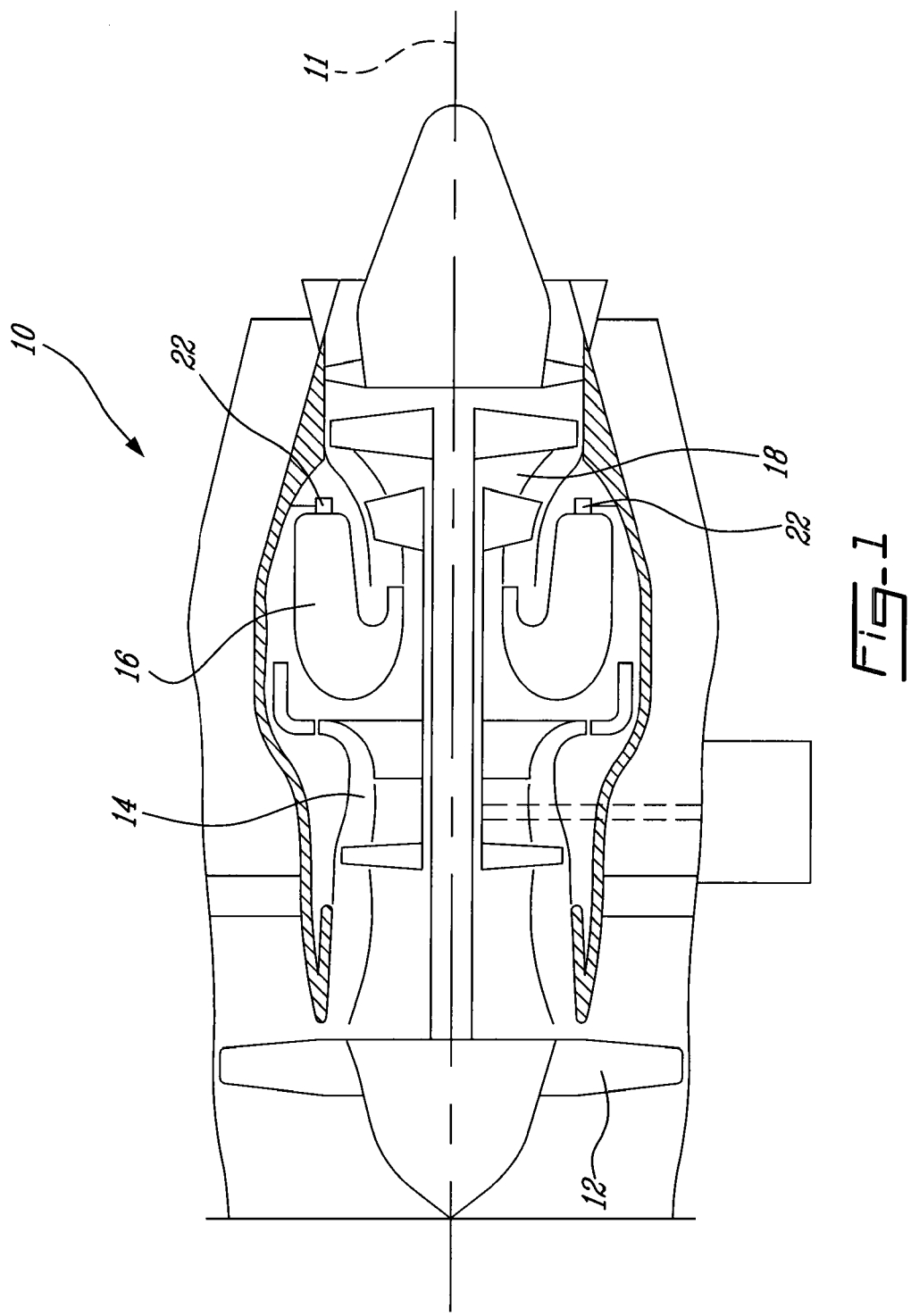
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
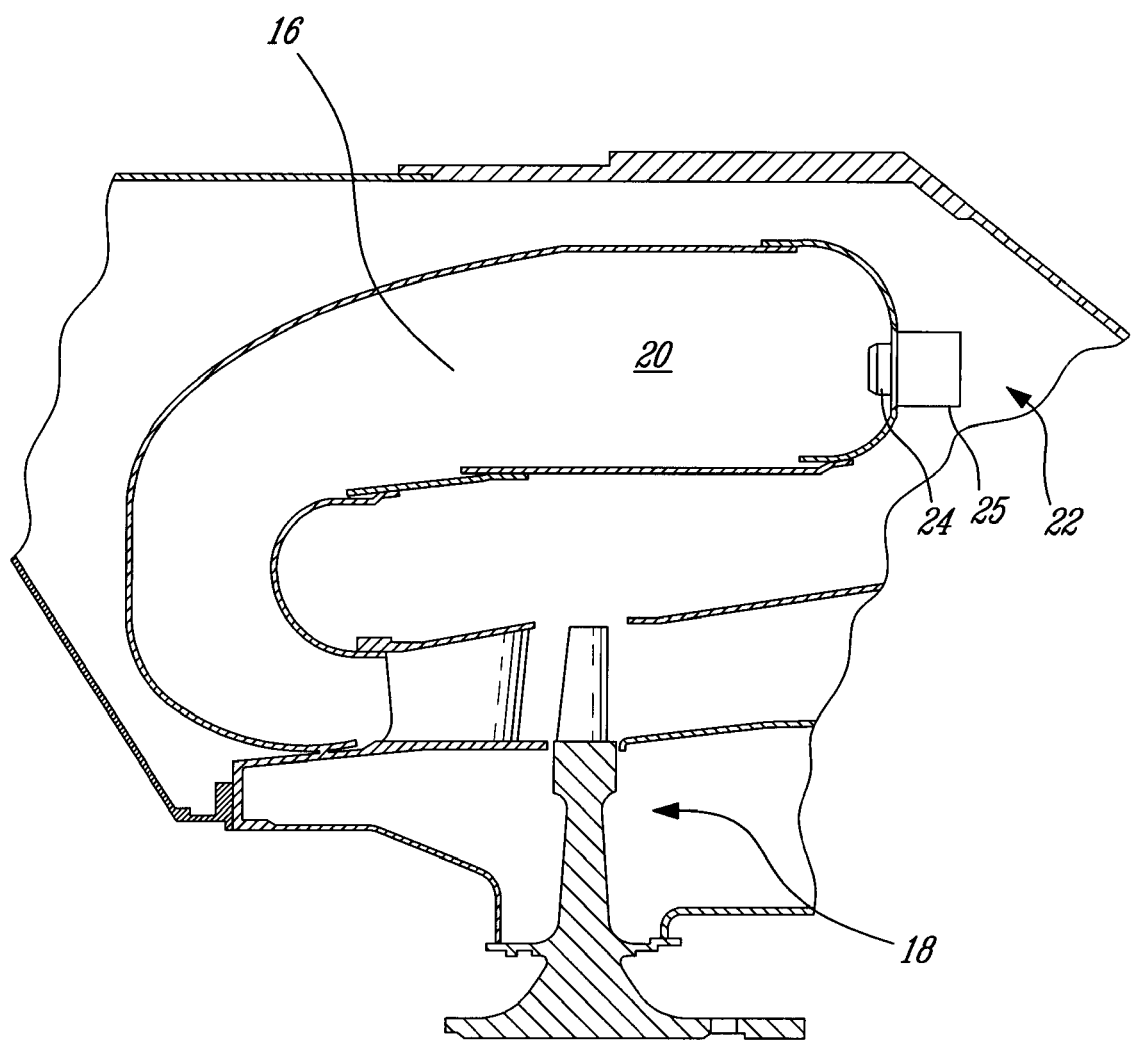
FIG. 2 is a simplified axial cross-section of the combustor of the gas turbine engine illustrating one aerated fuel nozzle for atomizing fuel in the combustion chamber of the combustor.

As shown in FIG. 2, the combustor 16 comprises a combustion chamber 20 and a circumferential array of fuel nozzles 22 (only one being shown in FIG. 2) mounted at a dome end section of the combustion chamber 20 for atomizing fuel therein. Each fuel nozzle 22 has a nozzle tip or head 24 that can be mounted to an annular fuel manifold 25 which is, in turn, mounted next to the dome end section of the combustion chamber 20.

Figure 3:
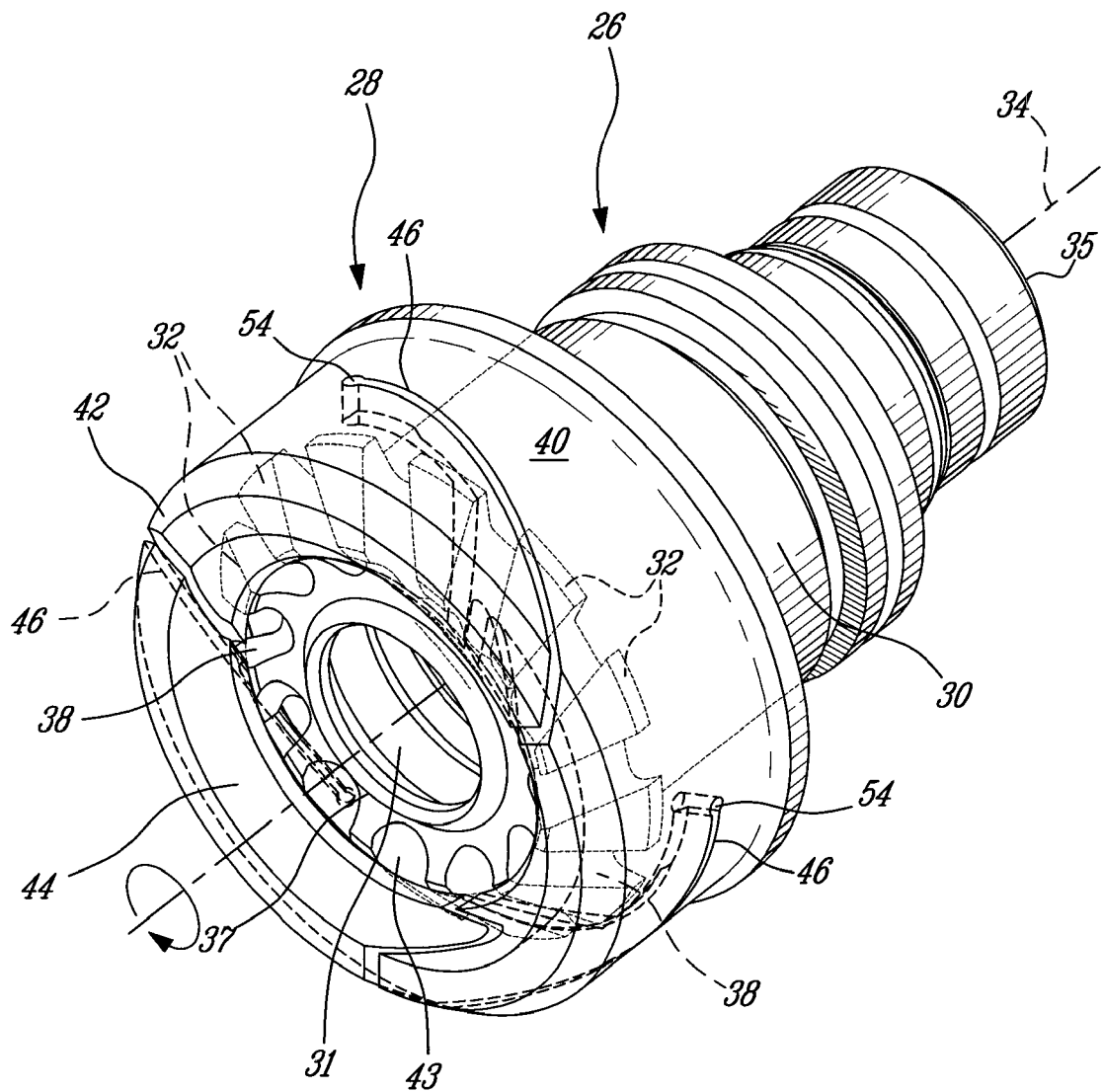
FIG. 3 is an exploded isometric view of a two-piece air swirler mounted at the tip of the fuel nozzle shown in FIG. 2, the two piece air swirler including a slotted cap and an air swirler body.
Figure 4:
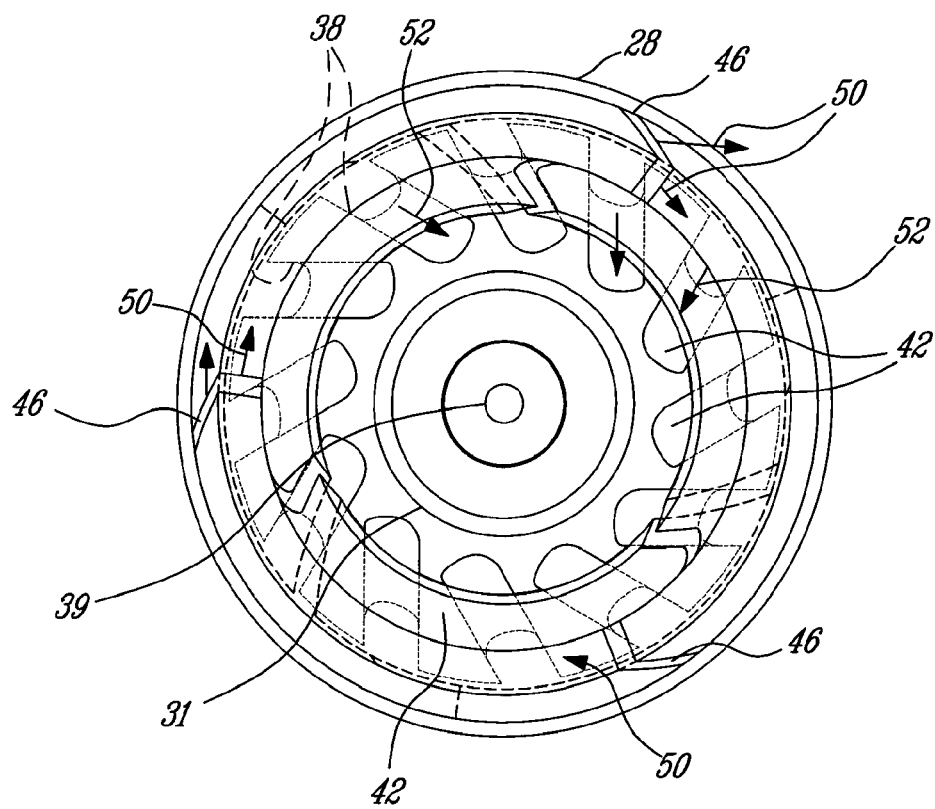
FIG. 4 is a front view of the two-piece air swirler shown in FIG. 3 and illustrating a direction of the air leakage from the slits defined in the slotted cap.
Figure 5:
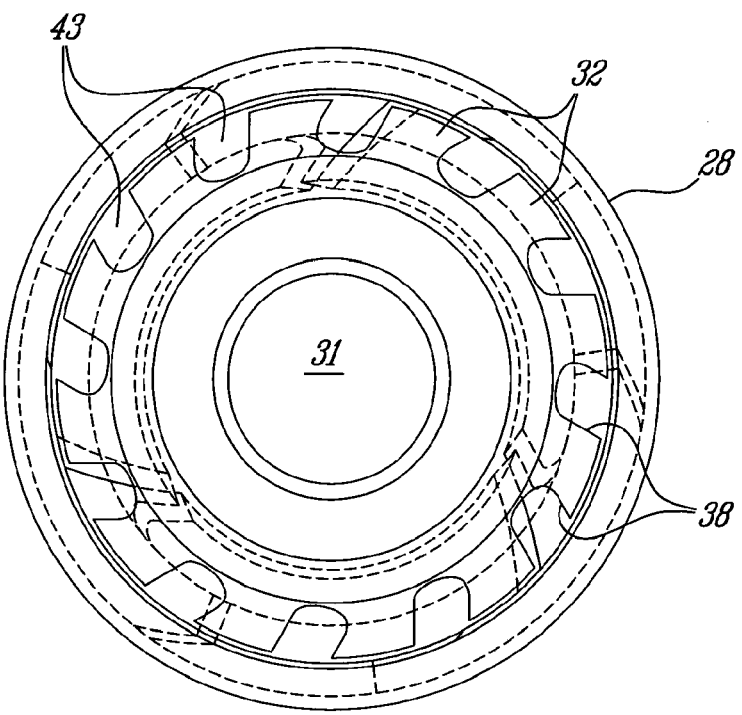
FIG. 5 is a rear view of the two-piece air swirler shown in FIG. 3 illustrating the orientation of the stress-relief slits relative to the air swirler passages.

As shown in FIG. 3, each nozzle tip 24 comprises a swirler 26 and an annular cap 28 securely fitted over the front end portion of the swirler 26, thereby forming a two-piece air swirler assembly. The swirler 26 has an axially extending tubular body 30 defining a central passage 31 extending axially between an inlet end 35 and an outlet end 37. A fuel spray tip 39 (FIG. 4) can be mounted at the outlet end 37 of the central passage 31. A circumferential array of air swirler vanes 32 extend from a front peripheral surface of the swirler body 30 about the central axis 34 thereof. The vanes 32 can be directly machined or integrally formed, such as by metal injection moulding, in the outer surface of the body 30. Each pair of adjacent vanes 32 defines an inter-vane slot 38 which is set obliquely to the central axis 34 when viewed from a front or rear point of view (see FIGS. 4 and 5). Each slot 38 has thus an axial component as well as a tangential component. The swirl angle of the vanes 32 is defined by the relation between the axial and tangential components of each inter-vane slot 38. According to the example illustrated in FIGS. 3 to 5, the inter-vane slots 38 are disposed to induce a clockwise swirling motion to the air passing therethrough when viewed from the front. It is understood that the air could be swirled in the counter-clockwise direction as well. Each inter-vane slot 38 can be inclined or slanted forwardly at an angle with respect to the central axis 34 for also directing the air in a radially inward direction towards the stream of fuel exiting the fuel spray tip 39 (FIG. 4), thereby promoting a better atomization of the fuel in the combustion chamber 20.

Referring concurrently to FIGS. 3 to 6, it can be seen that the cap 28 has a generally cylindrical body including an axially extending cylindrical outer surface 40 (FIG. 6) with a front bevelled edge 42 and a frusto-conical aerodynamic front surface 44 (FIG. 3) circumscribing the front opening of the cap 28. A smooth frusto-conical inner surface 46 (FIG. 6) is slightly axially recessed within the front open end of the cap 28 for mating engagement with the front surface of the swirler vanes 32. The inner surface 46 of the cap 28 longitudinally closes/seals the inter-vane slots 38, thereby providing closed-section channels or passages 43 for swirling the air flowing between the swirler vanes 32.

The cap 28 and the swirler vane body 30 can be designed with a maximum allowable tight fit. During certain engine operating conditions, the cap tight fit can become loose or snug fit due to thermal differential growth between the swirler vane body 30 and the cap 28. To avoid the cap 28 from walking out from the nozzle tip, the cap 28 can be brazed, mechanically secured or otherwise attach to the swirler body 30. However, the attachment (e.g. the brazing joint) of the cap 28 on the swirler vane body 30 results in high stresses in the swirler vanes 32 and in the joints between the cap 28 and the swirler vane body 30, which reduces the Low Cycle Fatigue (LCF) life of the fuel nozzle tip.

Reducing the hoop stress in the cap 28 can minimize the radial load on the swirler vanes 32 and, thus, the stresses. The hoop stress in the cap 28 can be reduced by providing a stress-relief slit in the cap 28 across the swirler air passages 43. In the illustrated example, three circumferentially spaced-apart slits 46 are provided in the cap 28. According to a non-illustrated embodiment, four circumferentially spaced-apart slits are provided in the cap 28. To minimize the effect of the air leakage through the slits on the swirl in the fuel spray cone, the slits 46 are designed with a compound angle so that the air leakage through the slits 46 has a tangential component in the same turning direction as the air exiting the air swirler passages 42, as depicted by arrows 50 and 52 in FIG. 4. As can be appreciated from FIGS. 4 and 5, the slits 46 can be cut to generally align with the swirler vane openings and with an angle in the direction of the swirler vane angle. By so swirling the leakage air, direct interference with the swirler flow of air from passages 43 is avoided.

Figure 6:
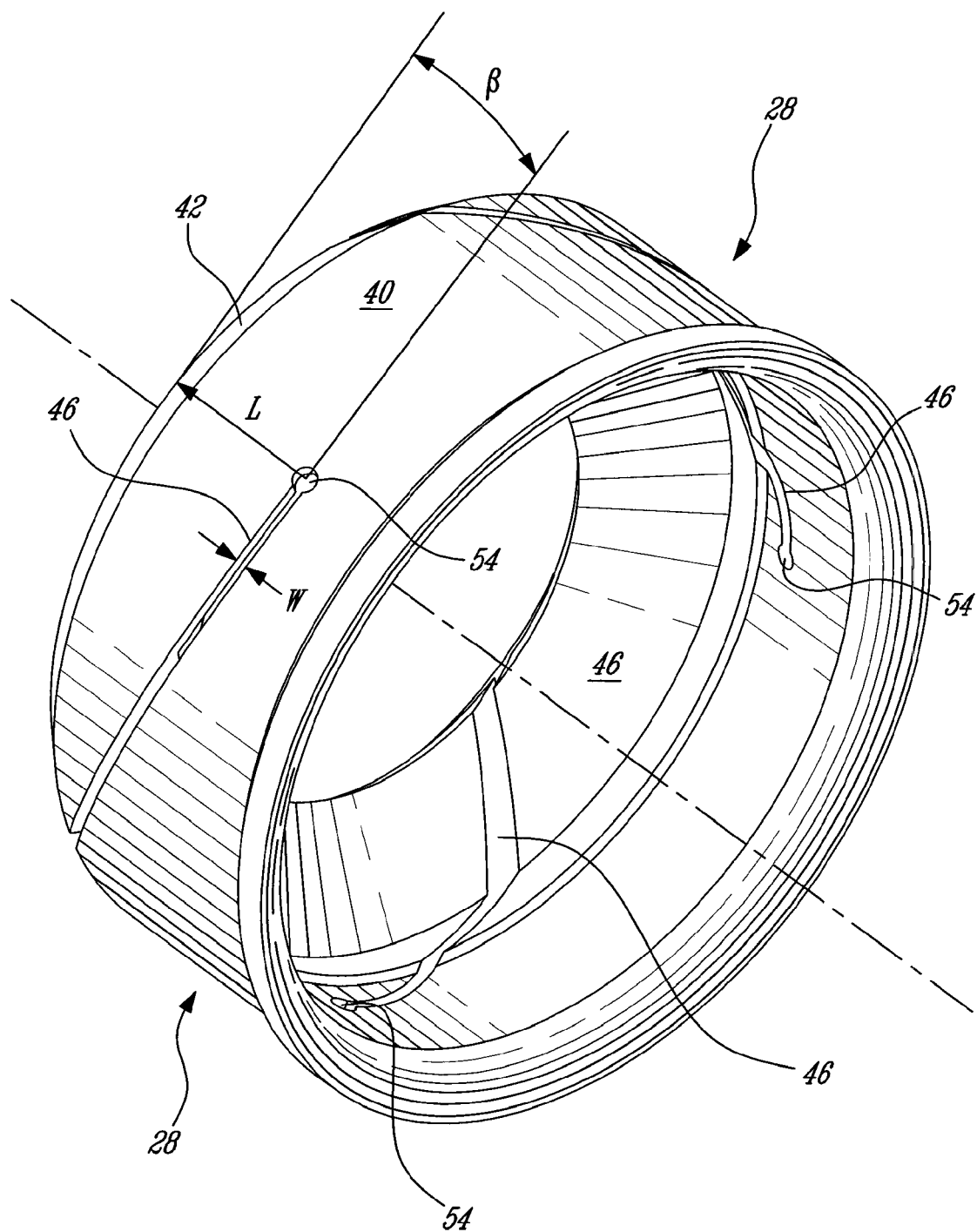
FIG. 6 is a top isometric view of the slotted cap illustrating the direction of the air leakage from the slits in the cap.

As best shown in FIG. 6, each slit 46 can be provided in the form of a helical slit extending in the outer cylindrical surface 40, the front bevel edge 42, the front frusto-conical surface 44 and the inner frusto-conical surface 46 of the cap 28. Each helical slit can be defined by a straight cut obliquely set in the cap 28 relative to the axis thereof, such as to have an axial component as well as a tangential/circumferential component. The relation between the tangential and axial component is set to have a swirl angle β which generally corresponds to that of the swirler vane angle. The swirl imparted to the air leakage minimizes the impact on the swirler aerodynamics in that the air leakage through the stress-relief slits does not interfere with the swirl of air from the air passages 43 but rather provides a complementary swirling flow. In this way, the swirler aerodynamic performances are preserved and the durability of the swirler is improved.

The depth (L) of each slit in the axial direction depends on the acceptable stress for the required durability. According to one example, the width (W) of the slits is comprised between about 0.007" and about 0.010". The slits aspect ratio (slit depth (L)/slit width (W)) is at least equal to 3. This helps to direct the air leaking through the slits 46 in the same direction as that of the air exiting from the air swirling passages 43.

As best shown in FIG. 6, each slit 46 terminates in a hole 54 having a diameter greater than the width W of the slit. According to one example, the hole 54 can have a diameter of about 0.060" to about 0.070". The holes 54 act as crack stoppers. It is understood that holes 54 are only one of the variety of ways that a crack stoppers could be provided to avoid stress singularity and crack formation at the end of the slits 46.

The slits 46 and the holes 54 can be machined in the cap 28 after or before securing the cap 28, such as by brazing, to swirler vane body 30. The slits can be machined either by wire Electro Discharge Machining (EDM), laser or by other conventional machining processes. The slit arrangement can be applied to new components as well as to existing components. For instance, it could be retrofitted to existing aerated fuel nozzles for extending the service life thereof.

The above description is meant to be exemplary only, and one skilled in the art will recognize that changes may be made to the embodiment described therein without departing from the scope of the invention disclosed. It is therefore within the ambit of present invention to cover any obvious modifications provided that these modifications fall within the scope of the appended claims.

What is claimed is:

1. An air swirler assembly for atomizing fuel discharged from a gas turbine engine fuel nozzle, comprising a swirler body having a circumferential array of air swirler vanes defined in a peripheral surface thereof about a central axis, and a cap securely fitted over the swirler body and cooperating with the air swirler vanes to define a plurality of air swirling passages, the cap having an annular body with at least one helical stress-relief slit defined in an outer surface, the helical stress-relief slit being set obliquely to the central axis to turn leakage air flowing from the air swirling passages through the helical stress-relief slit in a same direction as that of the air exiting from the air swirling passages.

2. The air swirler assembly defined in claim 1, wherein the cap has a cylindrical portion and a front conical portion converging frontwardly toward the central axis, and wherein the at least one helical stress-relief slot extends along both said cylindrical and front conical portions.

3. The air swirler assembly defined in claim 1, wherein there is provided at least two stress-relief slits, the stress-relief slits having a swirl angle corresponding to that of the swirler vanes.

4. The air swirler assembly defined in claim 3, wherein the stress-relief slit extends axially from a front face of the cap to a depth D, and wherein the stress-relief slit has a depth/width ratio at least equal to 3.

5. The air swirler assembly defined in claim 4, wherein the stress-relief slit has a width ranging from about 0.007" to about 0.010".

6. The air swirler assembly according to claim 1, wherein the at least one helical stress-relief slit extends across a plurality of the air swirling passages.

* * * * *